(12) United States Patent
Ikeda et al.

(10) Patent No.: US 11,643,142 B2
(45) Date of Patent: May 9, 2023

(54) CONTROL DEVICE AND CONTROL METHOD

(71) Applicant: ISUZU MOTORS LIMITED, Tokyo (JP)

(72) Inventors: Shingo Ikeda, Fujisawa (JP); Takashi Shima, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 333 days.

(21) Appl. No.: 16/978,608

(22) PCT Filed: Mar. 5, 2019

(86) PCT No.: PCT/JP2019/008603
§ 371 (c)(1),
(2) Date: Sep. 4, 2020

(87) PCT Pub. No.: WO2019/172241
PCT Pub. Date: Sep. 12, 2019

(65) Prior Publication Data
US 2021/0031832 A1  Feb. 4, 2021

(30) Foreign Application Priority Data

Mar. 5, 2018 (JP) ............................... JP2018-038447

(51) Int. Cl.
*B62D 15/02* (2006.01)

(52) U.S. Cl.
CPC ............... *B62D 15/0245* (2013.01)

(58) Field of Classification Search
CPC . B62D 15/0245; B62D 5/0481; B60W 40/10; B60W 30/095; G08G 1/167
See application file for complete search history.

(56) References Cited

U.S. PATENT DOCUMENTS

| 6,763,906 B1* | 7/2004 | Momiyama ............ B62D 7/144 701/42 |
| 2002/0005313 A1* | 1/2002 | Yamazaki ............ B62D 5/0403 180/443 |

(Continued)

FOREIGN PATENT DOCUMENTS

| CN | 102753409 A | 10/2012 |
| CN | 103249632 A | 8/2013 |

(Continued)

OTHER PUBLICATIONS

International Search Report and Written Opinion for related PCT App No. PCT/JP2019/008603 dated May 21, 2019, 8 pgs. (partial translation).

(Continued)

*Primary Examiner* — Mussa A Shaawat
(74) *Attorney, Agent, or Firm* — Procopio, Cory, Hargreaves & Savitch LLP

(57) ABSTRACT

This control device is provided with a detection unit that detects a steering angle of a vehicle, a determination unit that determines whether or not the vehicle is moving straight ahead, and an updating unit that, on the basis of the steering angle detected by the detection unit and the determination result in the determination unit, updates play section information indicating an angle range of steering angles corresponding to a play section of the steering of the vehicle. When the vehicle is determined to be moving straight ahead by the determination unit and the steering angle detected by the detection unit is beyond the angle range of steering angles indicating the play section at the current point in time, the updating unit updates the angle range so that the detected steering angle is included in the angle range.

4 Claims, 3 Drawing Sheets

(56) References Cited

U.S. PATENT DOCUMENTS

| | | |
|---|---|---|
| 2003/0028306 A1 | 2/2003 | Fujimori |
| 2006/0041358 A1 | 2/2006 | Hara |
| 2007/0144815 A1* | 6/2007 | Tsutsumi ............... B62D 5/003 180/402 |
| 2007/0205040 A1* | 9/2007 | Miyasaka ............ B62D 5/0481 180/444 |
| 2007/0215405 A1* | 9/2007 | Tsutsumi ............. B62D 5/0481 180/402 |
| 2007/0250234 A1* | 10/2007 | Ito ....................... B62D 5/0463 701/1 |
| 2008/0040001 A1* | 2/2008 | Ogawa ................. B62D 5/0487 310/68 B |
| 2009/0037054 A1* | 2/2009 | Igarashi ................. B62D 5/008 701/42 |
| 2012/0316745 A1 | 12/2012 | Futamura et al. |
| 2012/0323458 A1 | 12/2012 | Futamura et al. |
| 2013/0197762 A1* | 8/2013 | Schuberth .......... B62D 15/0285 701/42 |
| 2013/0311045 A1 | 11/2013 | Tanimoto et al. |
| 2014/0032051 A1* | 1/2014 | Ezoe ....................... B62D 6/001 701/42 |
| 2014/0240115 A1* | 8/2014 | Igarashi ................ B60W 30/08 340/435 |
| 2015/0120139 A1* | 4/2015 | Yamada ................. B62D 6/005 701/41 |
| 2017/0029026 A1* | 2/2017 | Okuda ................. B62D 15/025 |
| 2017/0341915 A1 | 11/2017 | Kaneko et al. |
| 2018/0023951 A1 | 1/2018 | Seo et al. |
| 2018/0154935 A1 | 6/2018 | Ohsugi |
| 2019/0185052 A1* | 6/2019 | Yoshida ............... B62D 5/0496 |
| 2021/0323602 A1 | 10/2021 | Acosta Aponte et al. |

FOREIGN PATENT DOCUMENTS

| | | |
|---|---|---|
| CN | 106029477 A | 10/2016 |
| CN | 107640151 A | 1/2018 |
| DE | 19815470 A1 | 10/1999 |
| DE | 102010032150 A1 | 1/2012 |
| DE | 102018211764 A1 | 1/2020 |
| JP | 2004110394 A | 4/2004 |
| JP | 2005028986 A | 2/2005 |
| JP | 2005035459 A | 2/2005 |
| JP | 2012228943 A | 11/2012 |
| JP | 2016078567 A | 5/2016 |
| JP | 2018020634 A | 2/2018 |
| TW | 546220 B | 8/2003 |
| WO | 2016167376 A1 | 10/2016 |

OTHER PUBLICATIONS

The State Intellectual Property Office of People's Republic of China, The First Office Action, Application No. CN201980017087.4, dated Feb. 9, 2022, in 19 pages.

German Patent and Trademark Office, Office Action, Application No. DE 112019001186.3, dated Sep. 1, 2022, in 9 pages.

* cited by examiner

CONTROL DEVICE AND CONTROL METHOD

CROSS-REFERENCE TO RELATED APPLICATIONS

This application is a U.S. National Stage entry of PCT Application No: PCT/JP2019/008603 filed Mar. 5, 2019, which claims priority to Japanese Patent Application No. 2018-038447 filed Mar. 5, 2018, the contents of which are incorporated herein by reference.

TECHNICAL FIELD

The present disclosure relates to a control device and a control method for managing a steering play section.

BACKGROUND ART

In recent years, it is known to specify an estimated traveling path of a vehicle based on a steering angle of the vehicle and control a behavior of the vehicle when an obstacle exists on the path (see, for example, Patent Literature 1).

CITATION LIST

Patent Document

Patent Literature 1: JP-A-2004-110394

SUMMARY OF THE INVENTION

Technical Problem

A vehicle has a steering play section in which a steering force does not change the direction of wheels even when a steering wheel is steered. Therefore, when specifying an estimated traveling path of the vehicle, it is required to specify the estimated traveling path in consideration of the play section of the steering.

In addition, in a vehicle equipped with a rigid suspension, when the loading state of the loads changes, the distortion state of an axle changes, and thus the play section of the steering angle of the steering changes. Therefore, it is desirable to appropriately update information indicating the play section, which is managed in the vehicle, according to the change of the play section.

An object of the present disclosure is to provide a control device and a control method capable of appropriately updating information indicating a steering play section.

Solution to Problem

According to a first aspect of the present disclosure, there is provided a control device including a detection unit that detects a steering angle of a vehicle, a determination unit that determines whether the vehicle is traveling straight or not, and an update unit that updates information indicating an angle range of the steering angle corresponding to a steering play section of the vehicle based on the steering angle detected by the detection unit and a determination result of the determination unit.

In a case where it is determined by the determination unit that the vehicle is traveling straight, the update unit may update the angle range in order that the steering angle detected by the detection unit is included in the angle range when the steering angle detected by the detection unit exceeds the present angle range.

In a case where it is determined by the determination unit that the vehicle is not traveling straight, the update unit may update the angle range in order that the steering angle detected by the detection unit is not included in the steering play section when the steering angle detected by the detection unit does not exceed the present angle range.

In a case where it is determined by the determination unit that the vehicle is not traveling straight, the update unit may update the angle range to a predetermined angle range when the steering angle detected by the detection unit does not exceed the present angle range.

According to a second aspect of the present disclosure, there is provided a control method including steps, which are performed by a computer, of detecting a steering angle of a vehicle, determining whether the vehicle is travling straight or not, and updating information indicating an angle range of the steering angle corresponding to a steering play section of the vehicle based on the steering angle detected in the detecting step of and a determination result in the determining step.

Advantageous Effects of Invention

According to the present disclosure, it is possible to achieve an effect of appropriately updating in indicating the steering play section.

DESCRIPTION OF EMBODIMENTS

Overview of Control Device 10

Figure 1:
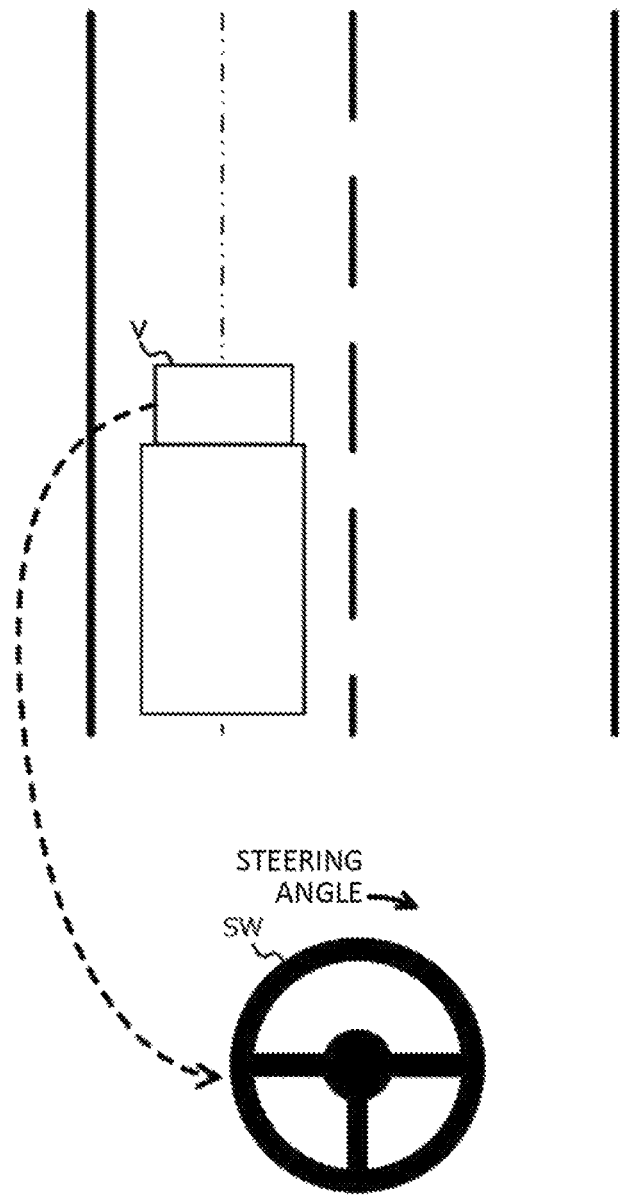
FIG. 1 is a diagram for illustrating an outline of a control device according to an embodiment.

FIG. 1 is a diagram for illustrating an outline of a control device 10 according to an embodiment. The control device 10 is, for example, a device for identifying a steering play section in a vehicle V equipped with a rigid suspension such as a bus or a truck. The control device 10 detects the steering angle of the vehicle V and determines whether the vehicle V is traveling straight or not ((1) and (2) in FIG. 1). The control device 10 updates the information indicating the angle range of the steering angle corresponding to the steering play section of the vehicle V based on the detected steering angle and the determination result ((3) in FIG. 1). Thus, the control device 10 can appropriately update the information indicating the steering play section in the vehicle V.

Subsequently, the configuration of the control device 10 will be described. In the following description, the angle range of the steering angle corresponding to the play section of the steering angle is also simply referred to as "angle range".

Configuration of Control Device 10

Figure 2:
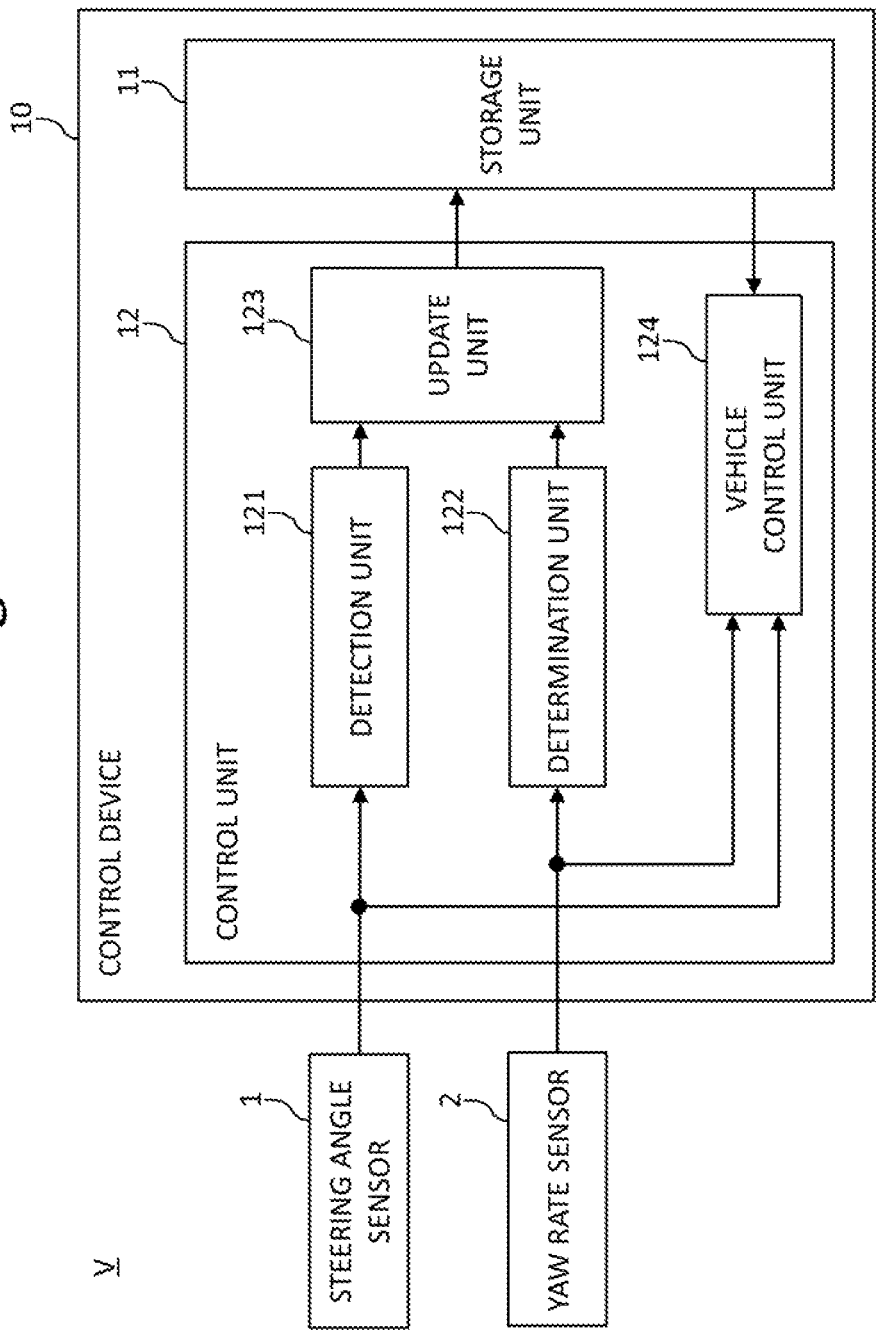
FIG. 2 is a diagram illustrating a configuration example of the control device according to the embodiment.

FIG. 2 is a diagram illustrating a configuration example of the control device 10 according to the embodiment.

As illustrated in FIG. 2, the control device 10 is electrically connected to a steering angle sensor 1 and a yaw rate sensor 2 provided in the vehicle V.

The steering angle sensor 1 is provided, for example, on a steering shaft (not illustrated) of the vehicle V. The steering angle sensor 1 detects the steering angle of a steering wheel SW connected to the steering shaft every predetermined dine (for example, 50 milliseconds). For example, the steering angle sensor 1 sets the angle of the steering wheel SW when the steering wheel SW is not operated at the time of factory shipment as a reference position and detects the rotation angle of the steering wheel SW from the reference position as the steering angle. The steering angle sensor 1 outputs steering angle information indicating the absolute value of the detected steering angle and the steering direction to the control device 10.

The yaw rate sensor 2 detects the yaw angular velocity generated in the vehicle V every predetermined time. The yaw rate sensor 2 outputs yaw angular velocity information indicating the detected yaw angular velocity to the control device 10.

The control device 10 includes a storage unit 11 and a control unit 12.

The storage unit 11 is, for example, a Read Only Memory (ROM), a Random Access Memory (RAM), or a hard disk. The storage unit 11 stores various programs for causing the control unit 12 to function. The storage unit 11 stores a vehicle control program which causes the control unit 12 to function as a detection unit 121, a determination unit 122, an update unit 123, and a vehicle control unit 124.

In addition, the storage unit 11 stores play section information indicating an angle range of a steering angle corresponding to the steering play section in the vehicle V. The storage unit 11 further stores initial value information indicating the initial value of the angle range. The initial value information is stored in the storage unit 11 when the vehicle V is shipped from the factory, for example.

The control unit 12 is, for example, a Central Processing Unit (CPU). The control unit 12 functions as the detection unit 121, the determination unit 122, the update unit 123, and the vehicle control unit 124 by executing the steering control program stored in the storage unit 11.

The detection unit 121 acquires the steering angle information output from the steering angle sensor 1 every predetermined time. The detection unit 121 detects the steering angle of the steering wheel SW provided on the vehicle V based on the acquired steering angle information.

The determination unit 122 acquires the yaw angular velocity information output from the yaw rate sensor 2 every predetermined time. The determination unit 122 determines whether the vehicle V is traveling straight or not based on the acquired yaw angular velocity information. Specifically, the determination unit 122 determines that the vehicle V is traveling straight in a case where the acquired yaw angular velocity information is less than a predetermined velocity which is set in advance and the determination unit 122 determines that the vehicle V is not traveling straight in a case where the as angular velocity information is equal to or higher than the predetermined velocity which is set in advance. The determination unit 122 may detect the lateral acceleration generated in the vehicle V and determine whether the vehicle V is traveling straight or not based on the lateral acceleration. Alternatively, the determination unit 122 may detect the rotation speeds of the left and right wheels of the vehicle V and determine whether the vehicle V is traveling straight or not based on the difference between the rotation speeds of the left and right wheels.

The update unit 123 updates the play section information stored in the storage unit 11 and indicating the angle range of the steering angle corresponding to the steering play section of the vehicle V based on the steering angle detected by the detection unit 121 and the determination result in the determination unit 122.

Specifically, in a case where the determination unit 122 determines that the vehicle V is traveling straight, if the steering angle detected by the detection unit 121 exceeds the present angle range of the steering angle indicated by the play section information set at the present time, the update unit 123 updates the angle range so that the detected steering angle is included in the angle range. For example, the update unit 123 expands the angle range by setting the upper limit value or the lower limit value of the angle range of the steering angle indicated by the play section information to the steering angle detected by the detection unit 121.

For example, it is assumed that the present angle range of the steering angle indicated by the play section information stored in the storage unit 11 at the present time is from −10° to +10°. In this case, when the vehicle V is determined to be traveling straight in the determination unit 122 and the steering angle detected by the detection unit 121 is +11°, the update unit 123 updates the angle range of the steering angle indicated by the play section information stored in the storage unit 11 from −10° to +11°.

In a case here the determination unit 122 determines that the vehicle V is not traveling straight, if the steering angle detected by the detection unit 121 does not exceed the present angle range of the steering angle indicated by the play section information set at the present time, the update unit 123 updates the angle range so that the detected steering angle is not included in the play section.

For example, it is assumed that the present angle range of the steering angle indicated by the play section information set at the present time is −10° to +10° and the initial value of the angle range of the play section is −3° to +3°. In this case, when the vehicle V is determined not to travel straight in the determination unit 122 and the steering angle detected by the detection unit 121 is +8 20, the update unit 123 updates the angle range of the steering angle indicated by the play section information to the angle range (from −3° to +3°) corresponding to a predetermined initial value.

The update unit 123 may reduce the angle range by setting the upper limit value or the lower limit value of the angle range of the steering angle indicated by the play section information as the steering angle detected by the detection unit 121. For example, it is assumed that the present angle range of the steering angle indicated by the play section information set at the present time is −10° to +10°. In this case, when the vehicle V is determined not to travel straight in the determination unit 122 and the steering angle detected by the detection unit 121 is +8°, the update unit 123 updates the angle range of the steering angle indicating the play section from −10° to +8°.

The update unit 123 may change the update frequency of the information indicating the angle range of the steering angle corresponding to the play section. For example, in a case where the vehicle V stops for a predetermined first time (for example, one hour) or more, the update unit 123 may update the play section information every third time (for example, 50 milliseconds) during a second time (for example, 30 minutes) after the vehicle V starts traveling. Then, the update unit 123 may update the play section information every fourth time (for example, 1 second) longer than the third time when the second time has elapsed after the vehicle V started traveling.

The change in the steering play section is caused by the change in the load capacity of the load loaded on the vehicle V. On the other hand, the control device 10 frequently updates the play section information after an event such as a long-term stoppage in which the load capacity of the load is likely to change occurs. Thus, the control device 10 can quickly match the play section indicated by the play section information with the actual play section. In a case where a predetermined time has passed since the occurrence of an event that is likely to change cargo handling such as long-term stopping and there is a high possibility that cargo handling has not changed, the control device 10 can reduce the processing load related to the update of the play section information by reducing the update of the play section information.

The vehicle control unit 124 acquires the steeling angle information output from the steering angle sensor 1 at predetermined time intervals, and also acquires the yaw angular velocity information output from the yaw rate sensor 2. The vehicle control unit 124 specifies the estimated traveling path of the vehicle V based on the acquired steering angle information, yaw angular velocity information, and the play section information stored in the storage unit 11. Here, the play section information stored in the storage unit 11 is updated by the update unit 123 at any time. Therefore, the vehicle control unit 124 can accurately specify the estimated traveling path of the vehicle V based on the play section information.

The vehicle Control unit 124 acquires an image of the surroundings of the vehicle V from an imaging device (not illustrated) every predetermined time. When the vehicle control, unit 124 analyzes the acquired image and detects an obstacle on the estimated traveling path, the vehicle control unit 124 controls the brake provided on the vehicle V to brake the vehicle V.

Flow of Processing in Control Device 10

Figure 3:
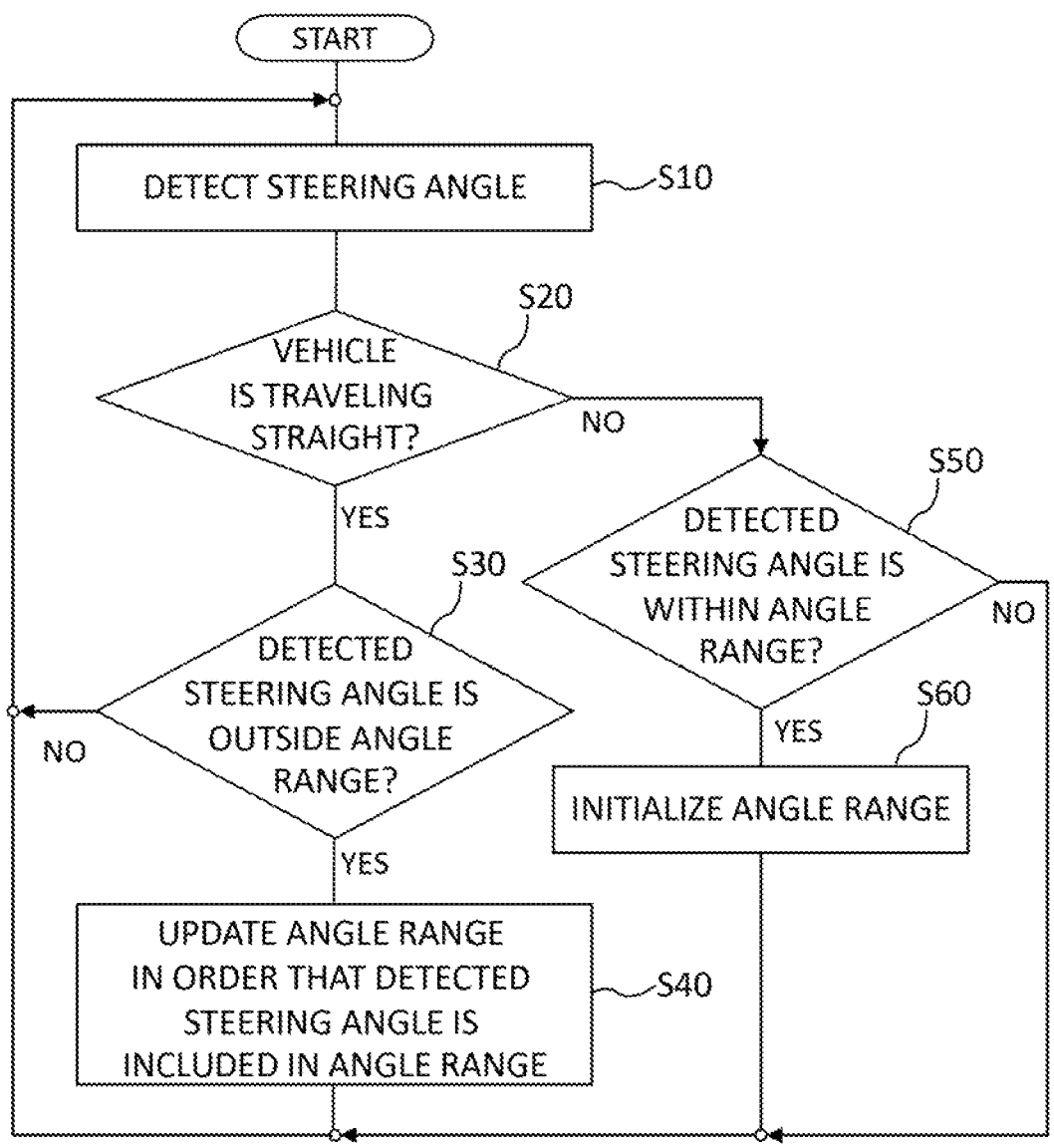
FIG. 3 is a flowchart illustrating a processing flow in the control device according to the embodiment.

Next, the flow of processing in the control device 10 will be described. FIG. 3 is a flowchart illustrating the flow of processing in the control device 10 according to the embodiment.

First, the detection unit 121 detects the steering angle of the vehicle V (S10).

Subsequently, the determination unit 122 determines whether the vehicle V is traveling straight or not (S20). When the determination unit 122 determines that the vehicle V is traveling straight, the process proceeds to S30, and when it determines that the vehicle V is not traveling straight, the process proceeds to S50.

In this flowchart, the control device 10 executes the process by the determination unit 122 after the process by the detection unit 121, but the process is not limited to this. The control device 10 may execute the process by the detection unit 121 after the process by the determination unit 122, or may execute the process by the detection unit 121 and the process by the determination unit 122 in parallel.

In S30, the update unit 123 determines whether the steering angle detected by the detection unit 121 is outside the angle range indicated by the play section information. The update unit 123 shifts the processing to S40 in a case where the detected steering angle is outside the angle range and shifts the processing to S10 in a case where the detected steering angle is within the angle range.

In S40, the update unit 123 updates the angle range so that the steering angle detected by the detection unit 121 is included in the angle range indicated by the play section information. When the processing relating to S40 ends, the update unit 123 shifts the processing to S10.

In S50, the update unit 123 determines whether the steering angle detected by the detection unit 121 is within the angle range indicated by the play section information. The update unit 123 shifts the processing to S60 in a case where the detected steering angle is within the angle range, and shifts the processing to S10 in a case where the detected steering angle is outside the angle range.

In S60, the update unit 123 initializes the angle range indicated by the play section information by updating the angle range corresponding to a predetermined initial value. When the processing relating to S60 ends, the update unit 123 shifts the processing to S10.

Effects of Embodiment

As described above, the control device 10 according to the embodiment detects the steering angle of the vehicle V and determines whether the vehicle V is traveling straight or not. Then, the control device 10 updates the angle range of the steering angle corresponding to the steering play section based on the detected steering angle and the determination result of whether the vehicle V is traveling straight or not. Thus, the control device 10 can update the angle range of the steering angle indicated by the play section information to an appropriate angle range even when the steering play section changes according to the state of the vehicle V.

The control device 10 updates the angle range so that the steering angle is included in the angle range in the case where the steering angle detected when it is determined that the vehicle V is traveling straight exceeds the present angle range. Thus, the control device 10 can update the play section information corresponding to a case where the play section of the steering angle is expanded due to a change M the load state of the vehicle V, for example.

The control device 10 updates the angle range so that the steering angle is not included in the angle range in the case where the steering angle detected when it is determined that the vehicle V is not traveling straight does not exceed the present angle range. Thus, the control device 10 can update the play section information corresponding to the case where the play section of the steering angle is reduced due to a change in the load state of the vehicle V, for example.

The invention is described above with reference to the embodiment. However, the technical scope of the invention is not limited to the scope described in the above embodiment and various modifications and changes can be made Within the scope of the gist thereof. For example, the specific embodiment of device distribution/integration is not limited to the above embodiment and all or part of the device may be functionally or physically distributed/integrated in arbitrary units.

This application is based on a Japanese patent application filed on Mar. 5, 2018 (Japanese Patent Application No 2018-038447), the contents of which are incorporated herein by reference.

INDUSTRIAL APPLICABILITY

The control device and control method of the present disclosure are useful in appropriately updating information indicating the steering play section.

LIST OF REFERENCE NUMERALS 1 steering angle sensor
2 yaw rate sensor 10 control device
11 storage unit
12 control unit
121 detection unit
122 determination unit
123 update unit
124 vehicle control unit
V vehicle

The invention claimed is:

1. A control device comprising:
a detection unit that detects a steering angle of a vehicle;
a determination unit that determines whether the vehicle is traveling straight or not; and
an update unit that updates information indicating an angle range of the steering angle corresponding to a steering play section, in which a steering force does not change a direction of wheels of the vehicle even when a steering wheel is steered, of the vehicle based on the steering angle detected by the detection unit and a determination result of the determination unit.

2. The control device according to claim 1, wherein, in a case where it is determined by the determination unit that the vehicle is traveling straight, the update unit updates the angle range in order that the steering angle detected by the detection unit is included in the angle range when the steering angle detected by the detection unit exceeds a present angle range.

3. The control device according to claim 1, wherein, in a case where it is determined by the determination unit that the vehicle is not traveling straight, the update unit updates the angle range in order that the steering angle detected by the detection unit is not included in the steering play section when the steering angle detected by the detection unit does not exceed a present angle range.

4. The control device according to claim 3, wherein, in a case where it is determined by the determination unit that the vehicle is not traveling straight, the update unit updates the angle range to a predetermined angle range when the steering angle detected by the detection unit does not exceed the present angle range.

* * * * *